United States Patent [19]
Dinh-Sybeldon et al.

[11] Patent Number: 6,051,335
[45] Date of Patent: Apr. 18, 2000

[54] NONCIRCULAR FIBER BATTERY SEPARATOR AND METHOD

[75] Inventors: Ann Dinh-Sybeldon; Thomas Danko, both of Woodridge; Jeffery Allen Oxley, Naperville, all of Ill.

[73] Assignee: Viskase Corporation, Chicago, Ill.

[21] Appl. No.: 09/100,872

[22] Filed: Jun. 22, 1998

[51] Int. Cl.[7] .............................. H01M 2/16; H01M 2/18
[52] U.S. Cl. .......................... 429/142; 429/247; 429/249
[58] Field of Search .................................. 429/142, 247, 429/249

[56] References Cited

U.S. PATENT DOCUMENTS

| | | | |
|---|---|---|---|
| 3,463,669 | 8/1969 | Jammet | 136/6 |
| 3,980,497 | 9/1976 | Gillman et al. | 429/145 |
| 4,234,623 | 11/1980 | Moshtev et al. | 427/54.1 |
| 4,378,414 | 3/1983 | Furukawa et al. | 429/144 |
| 4,741,979 | 5/1988 | Faust et al. | 429/144 |
| 4,767,687 | 8/1988 | LaBonte | 429/206 |
| 4,812,145 | 3/1989 | LaBonte | 29/623.1 |
| 5,366,832 | 11/1994 | Hayashi et al. | 429/249 |
| 5,426,004 | 6/1995 | Bayles et al. | 429/144 |
| 5,462,820 | 10/1995 | Tanaka | 429/174 |
| 5,634,914 | 6/1997 | Wilkes et al. | 604/375 |
| 5,700,599 | 12/1997 | Danko et al. | 429/249 |
| 5,700,600 | 12/1997 | Danko et al. | 429/249 |
| 5,942,354 | 8/1999 | Oxley et al. | 429/247 |

OTHER PUBLICATIONS

Danko, Thomas: "Properties of Cellulose Separators for Alkaline Secondary Batteries;" Proceedings of the 10th Annual Battery Conference on Applications and Advances, pp. 261–264 (Institute of Electrical and Electronics Engineers, Inc. Jan. 10–13, 1995).

Danko, Thomas et al.; "Ionic Resistance Measurements of Battery Separators;" Proceedings of the 12th Annual Battery Conference on Applications and Advances, pp. 97–98 (Institute of Electrical and Electronics Engineers, Inc. Jan. 14–17, 1997).

"Proceedings of Advances in Battery Technology Symposium", Dec. 6, 1968, pp. 72, 73 and 78 (The Electrochemical Society, Inc.).

Stanley E. Ross, "Nonwovens: An Overview" *Chemtech*, pp. 535–539, (Sep. 1972).

Harald Hoffmann, "Manufacture and Use of Nonwoven Separators", *Batteries International*, pp. 44–45 and 48 (Oct., 1995).

*Primary Examiner*—Maria Nuzzolillo
*Assistant Examiner*—Tracy Dove
*Attorney, Agent, or Firm*—Cedric M. Richeson

[57] ABSTRACT

A battery separator of a nonwoven substrate coated on at least one surface with a cellulose film made from a liquid cellulose or cellulose derivative solution with the substrate having at least 50% by wt. noncellulosic fibers having a noncircular cross-sectional perimeter which has a percentage cross-sectional area difference relative to a circumscribed circle according to the formula:

$$\frac{B-A}{B} \times 100 \geq 10$$

wherein A=Area of a noncellulosic fiber cross-section; and B=Area of a circle circumscribing said fiber cross-section and, preferably, having an absorption rate of at least 15, most preferably at least 30 mm/10 min. in an aqueous solution of 40 wt. % KOH.

40 Claims, 3 Drawing Sheets

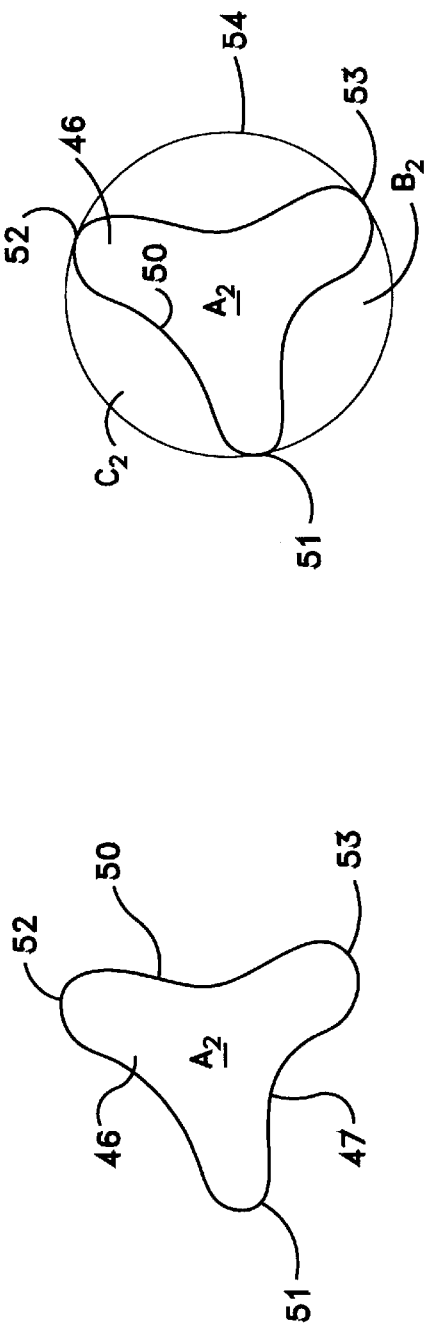
FIG. 6
FIG. 7
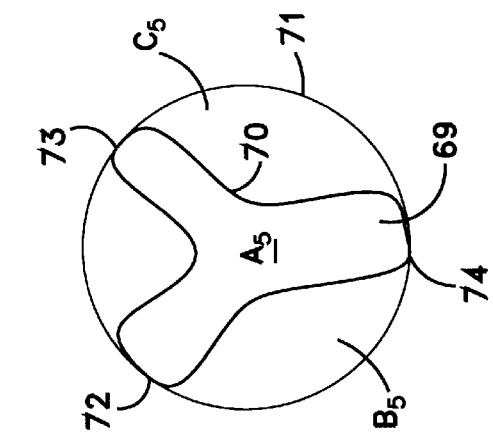
FIG. 10
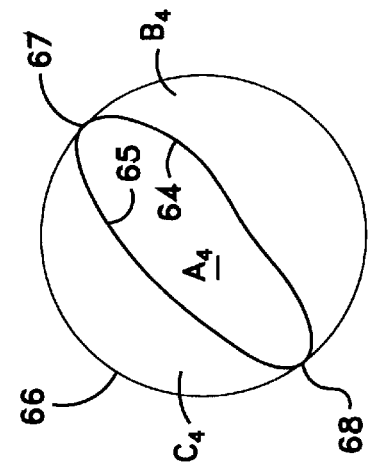
FIG. 9
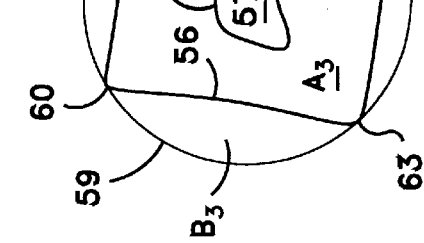
FIG. 8

NONCIRCULAR FIBER BATTERY SEPARATOR AND METHOD

BACKGROUND OF THE INVENTION

The present invention relates to battery separators and electric batteries.

The term "battery" as pertaining to electric batteries is used herein to denote one or more electric cells connected together to convert chemical energy into electrical energy. Batteries are used to power a variety of devices including radios, toys, hearing aids and portable equipment. An "electric cell" is a device for converting chemical energy into electric energy. Dry cell batteries have an electrolyte made nonspillable by use of an absorbent material. Dry cell batteries are also known as "LeClanche" cells after George LeClanche who received a French patent in 1866 for an electric cell having a zinc electrode and a $MnO_2$ coated carbon electrode in a nonspillable (hence the term "dry") electrolyte of ammonium chloride paste. By the 1960s other electrode systems including Ag/Zn, HgO/Zn and alkaline $MnO_2$/Zn cells were in use.

All batteries have at least one anode and one cathode separated by electrolyte and preferably a battery separator. "Battery separators" are physical barriers interposed between the anode and the cathode which prevent physical contact therebetween. Battery separators must be permeable to electrons and/or ions.

A variety of materials have been used as battery separators. Various dry cell and storage batteries have employed wheat flour and cornstarch paste, paper, wood veneer, hard rubber, porous rubber, celluloid, glass mats, regenerated cellulose and fiber-reinforced regenerated cellulose (sausage casings). A variety of materials have been explored for use as battery separators including polyvinyl alcohol, methyl cellulose, polypropylene, fiberglass, and crosslinked methacrylic acid grafted polyethylene. These separators are used to separate the positive and negative electrodes of a cell to prevent short circuits. Separators should distribute and retain electrolyte between the electrodes while preventing dendritic growths or soluble products from shorting the cell or migrating to an opposing electrode. Desirably, separators will: be stable in the cell environment resisting degradation by cell media; permit conduction across the separator of current transferring ions or charges; be capable of operation under conditions of use including desired operating temperatures, pressures, and forces; and be easily and economically fabricated into electric cells.

Battery separators have been used almost from the beginning of electric cell and battery development. Felted cloth, strips of rubber, thin wood, plastic, impregnated paper, microporous poly(vinylchloride), and woven fabrics of cotton or nylon have been used. Sealed cell batteries often use separators which absorb all available electrolyte. Generally these absorbent separators are nonwoven. The earliest absorbent separators were cellulosic and later, resin bonded paper and polyamide based nonwovens were also used. Sterilizable nonwoven fabrics of polypropylene have also been used. Ag/Zn batteries have used cellulose fiber reinforced casing type separators since the 1960s.

Regenerated cellulose film (cellophane) has also been used as a battery separator, e.g. for Ag/Zn batteries. Disadvantageously, it suffers from a low electrolyte absorption rate. Noncellulosic nonwovens have also been laminated to cellulose films using adhesives to produce separators having high electrolyte absorbance and a fast absorption rate. Nonwoven polyamides, poly(vinyl alcohol) (PVOH), acrylonitrile-vinyl chloride copolymer, polyesters, and polypropylenes have all been used as battery separators. Blends of PVOH with cellulose fibers have also been used as described in the article "Manufacture and Use of Nonwoven Separators", *Batteries International*, pp. 44, 45 and 48, October, 1995, which article is hereby incorporated by reference in its entirety. Disadvantageously, laminate adhesives may interfere with electrolyte permeability across the separator and transfer of electrons and/or ions may be hindered causing increased resistance and lower voltage. Also, laminates using adhesives including laminates held together with low amounts of adhesive or adhesives chosen to minimize resistance and transfer hindrance are subject to delamination which leads to shorting and early battery failure.

U.S. Pat. Nos. 5,700,599 (Danko et al) and 5,700,600 (Danko et al) describe recent improvements in cellulosic coated nonwoven substrate battery separators, and their disclosures are hereby incorporated by reference.

SUMMARY OF THE INVENTION

This invention relates to a battery separator, preferably a cellulosic extrusion coated battery separator having improved electrolyte absorption rates and batteries made therefrom. Fast electrolyte absorptive rates are important in high speed battery manufacture, particularly of can-type batteries such as the well known D, C, AA, AAA, and AAAA dry cell batteries. Faster absorption rates permit manufacturing lines to run faster thereby increasing productivity. The invention is capable of providing 40 wt. % KOH electrolyte absorptive rates of at least 15, preferably at least 20, more preferably at least 25, and most preferably at least 30 mm/10 minutes.

Battery separators of a nonwoven substrate of noncircular, especially triangular or multi-lobar, fibers which have on at least one surface a cellulosic film, which is preferably extrusion coated, are disclosed. These fibers are noncellulosic or blends thereof with cellulosic fibers. Fundamental to the present invention is provision of a battery separator comprising a nonwoven substrate coated or laminated with regenerated cellulose or a cellulose derivative on at least one side of said substrate; the substrate comprising at least 50% by wt. of noncellulosic fibers having a noncircular cross-sectional perimeter which has a percentage cross-sectional area difference relative to a circumscribed circle according to the formula:

$$\frac{B-A}{B} \times 100 \geq 10$$

wherein A=Area of a noncellulosic fiber cross-section; and B=Area of a circle circumscribing the fiber cross-section.

Such separators are preferably stabilized e.g. by annealing and/or addition of a surfactant to prevent undesirable curling or wrinkles during assembly of the separator with a cathode, anode and electrolyte in battery manufacture.

The inventive separators are preferably made by a process comprising contacting a nonwoven substrate comprising noncircular, preferably triangular or multi-lobar, fibers as described above, with a liquid cellulose or cellulose derivative solution on at least one side of the substrate (preferably while forming into a tube); converting the solution to a solid cellulose or cellulose derivative film (preferably having a degree of polymerization of at least 350, more preferably at least 600), to form a coated substrate; washing the coated substrate in an aqueous solution, preferably water; drying the coated substrate under biaxial tension to provide a battery separator. The inventive separators may also be made by laminating a solid cellulose or cellulose derivative film to the above described nonwoven substrate using e.g. a chemical adhesive. However, such laminates disadvantageously tend to have higher resistance to current flow across the adhesive boundary and also may suffer from delamination during use leading to premature battery failure.

An inventive battery comprising an anode and a cathode separated by a battery separator, as defined above, and electrolyte is provided.

BRIEF DESCRIPTION OF THE DRAWING

FIG. 6 is a cross-sectional view of the fiber of FIG. 5 taken along line Y–Y'.

FIG. 7 is the view of FIG. 6 with a circle circumscribed about the perimeter of the fiber cross-section.

FIG. 8 is a cross-sectional view of a hollow rectangular fiber useful in the present invention with a circle circumscribed about the perimeter of the fiber cross-section.

FIG. 9 is a cross-sectional view of an oval fiber useful in the present invention with a circle circumscribed about the perimeter of the fiber cross-section.

FIG. 10 is a cross-sectional view of a Y-shaped fiber useful in the present invention with a circle circumscribed about the perimeter of the fiber cross-section.

DETAILED DESCRIPTION OF THE INVENTION

Figure 1:
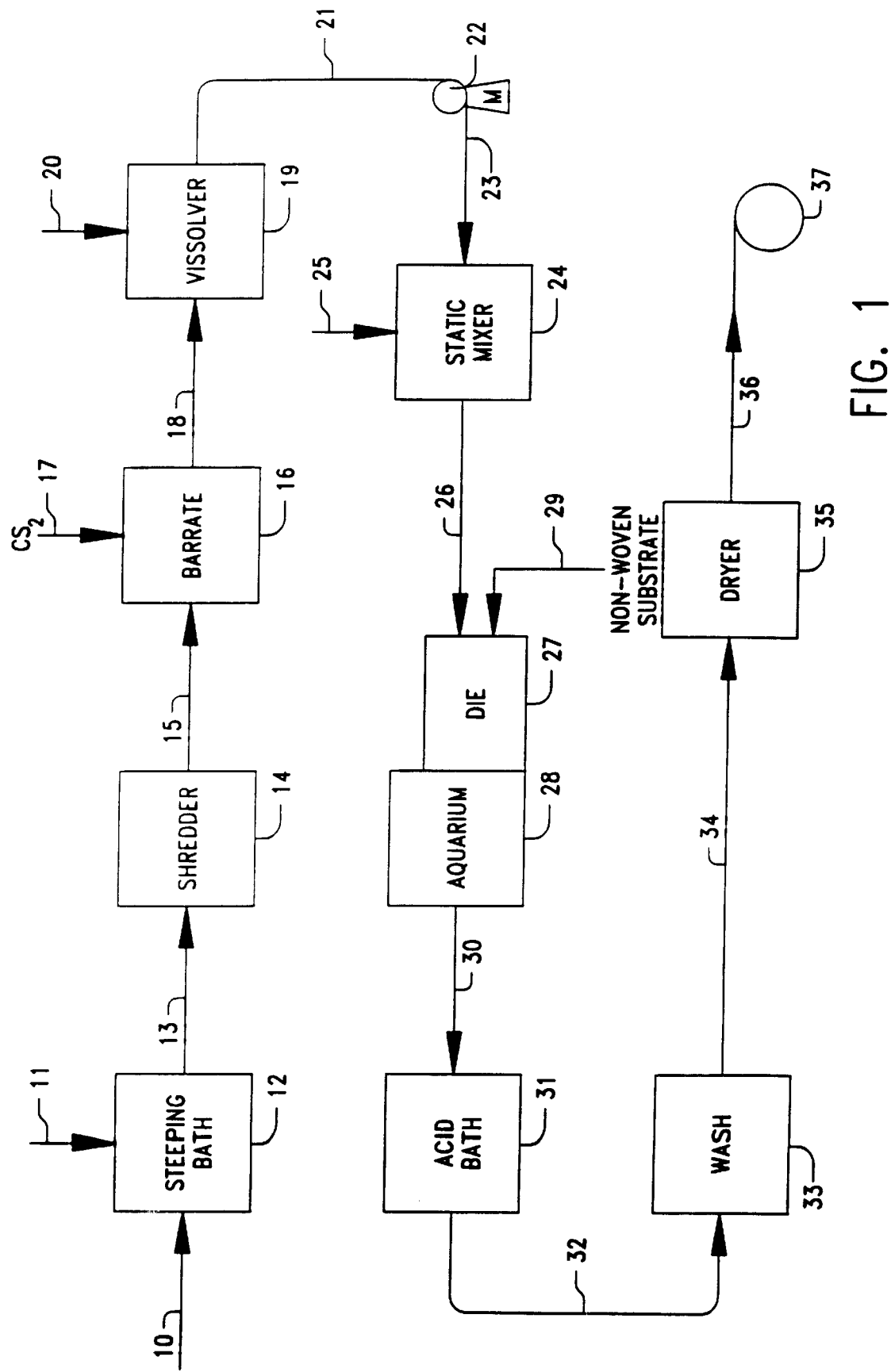
FIG. 1 is a schematic representation of a process for making an article according to the present invention.

Battery separators provide mechanical spacing between electrodes to prevent shorting. Characteristics of good battery separators include: physical strength to hold up in use and facilitate ease of battery manufacture; a high dielectric constant to prevent shorting; a minimum electrolytic resistance to provide high current flow; physical and chemical stability in the cell environment; and prevention of solids transfer from electrode to electrode which could cause shorting. Beneficially, separators may also have the following additional characteristics: good lay flat ability, curl resistance and flexibility to facilitate battery manufacture; gas permeability to reduce intracell pressure build up; effective control of migration of certain metal species to prevent premature battery failure; and low cost. A particularly useful property of commercially desirable battery separators is rapid wetting and rewetting to facilitate high speed manufacture. Rapid wetting and rewetting also facilitates rechargability of batteries after use.

A typical can-type battery has five basic components: the battery can itself (which is a container for the remaining parts); the cathode; the anode; the separator (which keeps the cathode and anode from touching and short-circuiting); and the electrolyte (which provides a path for electrical flow between the cathode and anode).

In the manufacture of a typical can-type battery, for example, a battery can is coated or filled around its inner surface with a cathode material followed by insertion of a separator along the surface of the cathode forming a basket shape. The electrolyte is then added and allowed to absorb into the separator. Finally, the anode is inserted inside the basket-shaped separator and the battery is sealed and ready for use.

The speed at which a battery may be produced is often limited by the time it takes for the battery separator to absorb the electrolyte. The anode cannot be added to the battery until absorption is completed because otherwise insertion of the anode will cause the electrolyte to spill out of the can and reduce the amount of electrolyte available for efficient battery performance. The speed of manufacture therefore is often related to how quickly the electrolyte will absorb into the separator. This electrolyte absorption is related to various parameters including both the amount of electrolyte to be absorbed and the surface area available for absorption.

Prior art battery separators such as those commercially employed for dry cell can-type batteries have used nonwoven substrates coated on one side with viscose which is regenerated to produce a composite separator of an absorbent nonwoven separator having a regenerated cellulose coating on one side. The noncellulosic nonwovens used and/or disclosed as prior art separators are typically made from wet laid, dry laid or spun bonded polymeric fibers having a round or circular cross-section. These fibers are typically thermally or chemically bonded. These round fibers while commercially useful could be improved upon. It has been discovered that by varying the surface configuration of the noncellulosic fiber the electrolyte absorption rate of a cellulose coated nonwoven separator may be increased to a commercially significant extent. Productivity in high speed battery manufacture may be increased significantly due to the faster electrolyte absorption rate.

The inventive battery separators may also be constructed with a variety of useful properties such as degradation resistance, high electrolyte absorptive capacity, resistance to dendritic growths and shorting, which are all important parameters for battery separators used in high speed manufacturing processes. Various other prior art separators suffer from a variety of defects. For example, uncoated paper separators are subject to fast degradation by alkaline electrolytes causing shorting and failure. Regenerated cellulose films (cellophane), not having fiber reinforcement, are separators having low absorption rates making them unsuitable for high speed production of some batteries in which the separator must quickly become saturated with electrolyte prior to completion of the battery enclosure. These regenerated cellulose films are also subject to degradation by electrolyte leading to early battery failure and have undesirably low rewetting rates which deleteriously impact on rechargability of batteries, e.g. by slowing the recharge rate and process. Many separators are not sufficiently flexible or thin or uniform, for use in mass production of batteries, especially dry cell batteries.

Excessive curl may also interfere with high speed battery manufacture. Curl may be defined as the rolling of the separator back towards itself. It is a condition where a rectangular portion of a separator refuses to lay flat under its own weight on a planar surface. Conversely, a separator which is relatively free from curl is said to have good "layflat" characteristics. Curling forces may be present in more than one direction. For a wound reel of battery separator, a machine direction (longitudinal) curl may occur or curl may be present in a transverse direction (across the width of the separator). The degree of curl ranges from none to severe, with the worse type of curl being a rolled up condition similar to a New Year's Eve streamer or party blower. A severe transverse curl causes the separator to roll up in a straw shape.

Separators which are curl-free or which have good layflat characteristics are important in automated battery manufacture because the high speed handling equipment used to insert the separator into a battery container e.g. a battery can, requires a generally flat and flexible separator. For example, a vacuum plate may be used to hold a typically rectangular separator in place while additional handling equipment prepares the separator for insertion into a battery container. If the separator has a tendency to curl and the curling force exceeds the ability of the vacuum force to position the separator against the vacuum plate, then the separator cannot be properly inserted into the battery container resulting in production of defective batteries or a battery assembly line disruption causing downtime and/or loss of productivity.

Curl may be a particular problem for battery separators having a multiple layer structure of dissimilar materials. For example, it is possible that curl may be caused in a bilayer separator from the different materials of each layer having different levels of moisture. Also, it may be that use of a battery separator process e.g. involving reeling or creation of a tube, particularly under tensions which are optionally applied to induce orientation in one or more directions, may induce a tendency to curl. Curl may be caused by a combination of these or other factors. Regardless of the cause of curl, its presence is unacceptable when severe enough to negatively impact on battery performance, defects, or productivity of battery manufacture. Noncellulosic, nonwoven substrates such as polyamides when coated with a cellulose or cellulose derivative film, e.g., in a tubular manufacture process, have a tendency towards curling. This tendency appears to be dependent, in part, upon the manufacturing process of the nonwoven e.g. use of a wet laid polyamide nonwoven substrate has been found to result in less curl than a spunbonded polyamide nonwoven substrate. This curling is undesirable and causes waste in separator production because severely curled separators are unacceptable to battery manufacturers. Also, it is desirable to use less expensive nonwovens, e.g. a spunbonded nonwoven having a tendency to curl severely is less expensive than a wet laid nonwoven of the same type (such as polyamide) which curls to a lesser extent.

A curl resistant battery separator may be provided according to the teaching of U.S. application Ser. No. 08/982,926 (Oxley et al) now U.S. Pat. No. 5,924,854 which application is hereby incorporated by reference in its entirety. In addition it has been discovered that coating at least the inside surface of the tubular separator with an aqueous surfactant, for example a 1–2% aqueous solution of Surfynol™440 surfactant, improves layflat and appearance of the separator. Surfynol™440 surfactant is a mixture of ethoxylated acetylenic diols which was commercially available from Air Products and Chemicals, Inc. of Allentown, Penn., U.S.A.

The inventive separator comprises a nonwoven substrate comprising at least 50% by weight of non-round (non-circular in cross-section) noncellulosic fibers, preferably polyamide fibers, more preferably spunbonded polyamide fibers, with the substrate coated, preferably extrusion coated, on at least one surface with a cellulose film. These noncellulosic fibers have a noncircular cross-sectional perimeter which has a percentage cross-sectional area difference relative to a circumscribed circle according to the formula:

$$\frac{B-A}{B} \times 100 \geq 10$$

wherein A=Area of a noncellulosic fiber cross-section; and B=Area of a circle circumscribing said fiber cross-section.

By using extrusion coating, no glue, adhesive, or noncellulosic adhesive is needed to bond the substrate to the cellulosic film. The inventive separator may be, but preferably is not a laminate of cellulose film to a nonwoven held together by an adhesive. The preferred embodiment of the invention coats a nonwoven having at least 50 weight % of its fibers being noncellulosic (hereinafter termed "noncellulosic nonwoven"), with a liquid, plastified or extrudable cellulosic solution which is then solidified to physically unite the nonwoven and cellulosic coating. Thus, the cellulose film partially penetrates into the nonwoven substrate. Preferably, the separator has a absorption rate of at least 15, more preferably at least 20, still more preferably at least 25, and most preferably at least 30 mm/10 mi. in an aqueous 40 wt. % KOH solution, and/or a 40% KOH solution absorption capacity of at least 200 g/m². The inventive battery separator is preferably degradation resistant in electrolyte, delamination resistant, resists dendritic growth and shorting while providing low electrolytic resistance, high electrolyte capacity and a fast absorptive rate. Fundamental to the present invention is the concept of providing a substrate having a sufficient number, preferably at least 50%, more preferably at least 95%, of its constituent fibers having, in cross-section, radii of curvature which vary in length to produce recesses within a circle circumscribed about the farthest points of the cross-section of the fiber in an amount of area of at least 10%, preferably at least 25%, and most preferably at least 50%, of the circumscribed circular area. The non-circular cross-sectional perimeter of the fiber and its attendant indentations enhance the absorptive rate while maintaining the absorptive capacity of the separator. Advantageously, the geometry of the noncircular cross-section of the fibers will be such that when coated by cellulose it produces a cellulose coated, noncellulosic fiber-containing, nonwoven battery separator having an absorptive rate of at least 15, preferably at least 20, more preferably at least 25, and most preferably at least 30 mm/10 minutes.

The present invention is particularly useful with respect to the manufacture of alkaline dry cells. The inventive battery separators have very fast absorptive rates. They may also be stabilized to lay flat without deleterious curling and have a high level of electrolyte absorptive capacity while being resistant to delamination.

Typical alkaline dry cell batteries use electrolytes comprising 20–50 weight % potassium hydroxide (KOH) in aqueous solution. It is believed that absorptive properties of electrolytes such as aqueous KOH are linear with respect to basic strength of electrolytic solutions. In the present invention electrolyte absorptive properties are reported with respect to a 30 or 40 weight % aqueous solution of KOH. However, these are only tests to determine the absorptive property improvements. Separators having the presently claimed absorptive property values should exhibit similarly improved values when used with electrolytes having various strengths and compositions, and the claimed separators are not limited to use with electrolyte solutions of 30% or 40% KOH only.

The cellulosic film component of the battery separator may be made by a variety of procedures. For example, cellulose with or without chemical modifications, may be put into solution with a solvent, e.g. by dispersion or by dissolution, and then coated onto a nonwoven having noncellulosic fibers followed by solvent removal (with or without chemical modification of the cellulose) to solidify the formed cellulose-coated nonwoven article. Examples of known processes for production of cellulosic articles are the viscose, cuprammonium, N-methyl-morpholine-n-oxide, zinc chloride, cellulose acetate (with or without subsequent deacetylation), and cellulose carbamate processes as described in U.S. Patents e.g. U.S. Pat. Nos. 1,601,686; 2,651,582; 4,145,532; 4,426,228; 4,781,931; 4,789,006; 4,867,204; 4,999,149; 5,277,857; 5,451,364; 5,658,525; and 5,658,525; the teachings of which are all hereby incorporated by reference. Suitable cellulosic coatings include cellulose, regenerated cellulose, derivatized cellulose, deacetylated cellulose acetate, and cellulose or a cellulose derivative having a degree of polymerization of from 350 to 800 units. In one preferred embodiment, the degree of polymerization is at least 600 units. The formed battery separator may be a flat sheet or tube. It is contemplated that the present invention may utilize any known method of producing a cellulosic film. The cellulose coating can have additives for processing, or for improved properties including e.g. surfactants, and olefinic oxide polymers such as poly(ethylene oxide). Poly(ethylene oxide) may be added as a starting material e.g. to wood pulp, or added to a solution of cellulose or a cellulose derivative such as viscose in amounts up to about 20% by weight based on the weight of the cellulose, preferably from 1 to 10% by weight. Such poly(ethylene oxide) is believed to provide or facilitate plasticization without requiring addition of glycerin which is deleterious to battery separator performance. A suitable poly(ethylene oxide) is available from Union Carbide Corporation of Danbury, Conn., U.S.A. under the trademark Polyox® WSRN-10 which is a 100,000 molecular weight homopolymer.

The invention also uses a nonwoven substrate having noncellulosic fibers. Nonwoven substrates may further comprise natural cellulose fibers, synthetic cellulose fibers, or blends thereof. The term "nonwoven" as used herein refers to nonwoven papers, fabrics, or textiles and includes spunbonded webs, melt blown webs, dry lay webs, and wet lay webs. Nonwovens are made from natural or synthetic fibers bound together in a web. Suitable synthetic fibers include: noncellulosic fibers including thermoplastic polymers (including homopolymers and copolymers). Suitable noncellulosic fibers include such polymers as polyamide, polyester, polyolefins including polypropylene, poly(vinyl alcohol), polyesters, acrylonitrile-vinyl chloride copolymers or blends thereof. Other suitable synthetic fibers include cellulosic fibers such as regenerated cellulose, rayon, deacetylated cellulose acetate, cellulose acetate, cellulose carbamate, and lyocell, see e.g. U.S. Pat. No. 5,634,914 which is hereby incorporated by reference in its entirety. Suitable natural fibers include cellulosic fibers such as cotton, hemp, jute, and wood pulp. Noncellulosic fibers, either alone or in blends, are formed into a nonwoven web comprising noncellulosic fibers either alone or in combination with cellulosic fibers and/or binding means. Such binding means may be thermal, chemical and/or mechanical including e.g., hydrogen bonds, viscose, regenerated cellulose, other cellulose or cellulose derivative solutions which are then solidified, resins, sizing agents which also have bonding characteristics, alkyl ketene dimers, cellulosic esters, urethanes, polyolefins, cellulose acetate, poly (vinyl chloride), poly(vinyl acetate), poly(vinyl alcohol), acrylic resins, liquid based bonding agents, fusion bonds and mechanical bonding with fibers embedded in a solid matrix. Webs may be bonded in any suitable manner including saturation bonded, spray bonded, print bonded, and/or spunbonded. Thermal and/or solvent bonding of fibers may also be done. Polyester, polyamide and polyolefin fibers are typically spunbonded. Suitable nonwovens have been made by Cerex Advanced Fabrics, L.P. of Pensacola, Fla., U.S.A. under the trademark CEREX™ 2115. Preferred nonwovens are polyamides such as nylon 6; nylon 66; nylon 11; nylon 12; nylon 6,12; nylon 6/12 copolymer; and nylon 6/66 copolymer or blends thereof. These nonwoven nylons are typically spunbonded, dry laid or wet laid.

Fundamental to the present invention is use of a nonwoven substrate comprising noncircular noncellulosic fibers in which the substrate is coated (preferably extrusion coated) with a cellulosic film. If a better layflat condition is required, then the cellulose coated separator may be stabilized against curling by e.g. temperature and/or moisture annealing and/or addition of a surfactant coating.

Regarding the substrate, the fibers are preferably thermoplastic fibers having no anhydroglucose units, such as polyamides, polyesters, polyolefins or poly(vinyl alcohol)s. Also, the nonwovens in accordance with the present invention may be made by blending such noncellulosic fibers having noncircular cross-sectional fibers with varying amounts of circular fibers. Furthermore, blends of cellulosic fibers and noncellulosic fibers produce suitable nonwoven substrates for use in the present invention. Both natural and synthetic cellulosic fibers or blends thereof may be added to the noncellulosic fibers. Use of synthetic cellulosic fibers, for example, made by the NMMO process such as lyocell fibers may be extruded in varying cross-sectional shapes and are contemplated by the present invention.

The noncircular, noncellulosic fibers required by the invention will comprise at least 50% by weight, preferably at least 60%, more preferably at least 75% of the nonwoven substrate. In some preferred embodiments, the nonwoven substrate comprises at least 95 weight % of noncellulosic fibers. In an especially preferred embodiment, a nonwoven substrate having at least 95 weight % polyamide fibers are used. Preferred nonwoven materials comprise at least 95% fibrous material and 5% or less (0–5%) of additives including e.g. binding agents, hydrophilic character modifying agents, antistatic agents, electrolyte conductivity modifiers, electrolyte absorbance modifiers, or sizing agents including those as noted above.

Advantageously, the present invention will coat a nonwoven with a cellulosic film to produce a battery separator having at least about 20% by weight of added cellulose or a cellulose derivative coating based on the bone dry gauge (BDG) weight of the nonwoven and cellulosic coating. The term "bone dry gauge" as used herein refers to the total weight of cellulose (such as regenerated cellulose), and/or cellulosic or noncellulosic nonwovens such as paper or polyamide including any additives, which have been dried by heating in a convection oven at 160° C. for one hour to remove water moisture. Suitable cellulosic add-on levels are between about 20 to 500% BDG(based on the weight of the nonwoven separator). Preferably, the coating add-on will be at least 60% BDG, and more preferably between about 100–300% based upon the bone dry gauge weight of the nonwoven substrate.

With further respect to the present invention, the separator will generally have a thickness of 20 mils (508 microns) or less. Both planar, sheet, cylindrical and tubular articles are contemplated and tubular articles are typically slit and reeled to form wound sheets. A tubular manufacturing process is preferred in order to facilitate and achieve bidirectional orientation to improve strength, dimensional stability and/or uniformity.

A starting material in the manufacture of the present invention is high quality, relatively pure cellulose pulp (either cotton or wood), most typically in sheet form. Preferably, the cellulosic coating used in the invention is derived from a cellulose material having at least 90 weight % α-cellulose, more preferably at least 95 weight %, and most preferably at least 98 weight % α-cellulose. The higher the purity the stronger the separator and the less probability of battery failure due to the presence of impurities. In the manufacture of fibrous battery separators of the present invention, regenerated cellulose is generally made using the well known viscose process whereby a viscose solution is typically extruded through an annular die and is coated on one or more sides of a tube which is generally formed by folding a web of paper so that the opposing side edges overlap. The viscose impregnates the paper tube where the viscose solution is subsequently coagulated and regenerated by passing into a coagulating and regenerating bath to produce a tube of regenerated cellulose. Thus the substrate is in the shape of a tube as the solution is solidified. This tube is subsequently washed, and dried e.g. by inflation under substantial air pressure (which may also impart transverse direction orientation). A suitable viscose process is described below.

Referring now to FIG. 1, cellulose starting material in the form of sheets of pulp 10 and an aqueous solution of sodium hydroxide 11 are brought into contact in a steeping bath 12 to convert the cellulose to alkali cellulose. Typically, high quality cellulose pulp having a density between about 0.8–0.9 g/cm$^3$ is used with a 17–20 weight percent aqueous solution of sodium hydroxide.

This relatively pure cellulose is converted to alkali cellulose by steeping in a sodium hydroxide solution. Cellulose absorbs the sodium hydroxide and the fibers swell and open. The degree of steeping is preferably held to the minimum amount necessary to ensure uniform distribution of the sodium hydroxide on the cellulose. Cellulose is held in the steeping bath for about 50–60 minutes at a bath temperature of about 19°–30° C. and a 17–20 wt.% sodium hydroxide concentration.

In a typical steeping apparatus there is no forced circulation of caustic between the cellulose sheets, so it is important that the rate of filling the apparatus with caustic (fill rate) be such that the caustic reaches every portion of the sheets. The cellulose sheets are typically held in place in the steeping chamber by a support frame.

After steeping, the caustic is drained and excess absorbed sodium hydroxide solution is pressed out, typically by a hydraulic ram. A typical alkali cellulose composition is about 13–18% caustic, 30–35% cellulose and the remainder water (by wt.). The percent caustic and cellulose in the alkali cellulose is controlled by the well-known press weight ratio. This ratio is the weight of the wet cake after pressing divided by the weight of the original cellulose used. A typical press ratio is about 2.6–3.2. After the press out, the pressed alkali cellulose is transferred to shredding means such as a temperature controlled mechanical shredder 14 where the alkali cellulose fibers are pulled apart so that during xanthation the carbon disulphide contacts all portions of the alkali cellulose. The shredded alkali cellulose is aged for a suitable time to produce the desired degree of polymerization. There is an optimum shredding time for each system which can only be determined by testing. Typical shredding time is about 40–90 minutes. Heat is generated during the shredding step and the temperature may, for example, be controlled by means of a cooling water jacket around the shredder, preferably in the range of 25–35° C.

During a succeeding, preferred aging step, an oxidative process is initiated which breaks the cellulose molecular chains thereby reducing the average degree of polymerization which will in turn reduce the viscosity of the viscose to be produced. During the aging step, the shredded alkali cellulose is preferably maintained in covered vessels to prevent drying. Then the aged, shredded, alkali cellulose is transferred to a baratte 16 to which $CS_2$ is added to convert the alpha cellulose to cellulose xanthate. The amount of carbon disulphide used to achieve the desired conversion to cellulose xanthate is typically equal in weight to about 26–38% of the bone dry weight cellulose in the alkali cellulose, and preferably only enough to produce cellulose xanthate with acceptable filtration characteristics.

The length of time required for the xanthation reaction (conversion of alkali cellulose to cellulose xanthate) depends on the reaction temperature and the quantity of the carbon disulphide. Variations in such parameters as the quantity of carbon disulphide used as well as the temperature, and pressure during xanthation is determined by the desired degree of xanthation. The percent total sulphur is directly related to the amount of carbon disulphide introduced, including xanthate and by-product sulphur. In general, xanthation reaction conditions are varied to ensure that adequate conversion is achieved by reaching a total sulphur content greater than about 1.1 wt. %. Typically, there is about 0.4–1.5% by wt. sulphur in the by-products admixed with cellulose xanthate. The cellulose xanthate 18 is then transferred to a vissolver 19 with addition of a dilute aqueous solution (e.g. 3.6–5.0 wt. %) of sodium hydroxide 20 and the temperature is controlled and mixture agitated to place the cellulose xanthate into solution thereby forming viscose. This is the so-called viscose formation or "vissolving" step, in which sodium hydroxide is absorbed onto the cellulose xanthate molecule which becomes highly swollen and dissolves over a finite time period. This step is preferably accelerated by cooling and agitation. Sufficient cooling is preferably provided to maintain the mixture at about 10° C. or less. The quality of the solution is typically determined by measuring the filterability of the viscose e.g. by rate of clogging or throughput through a filter such as a cloth filter.

The formed viscose 21 is allowed to ripen to achieve the desired xanthation, deaerated and filtered under controlled temperature and vacuum. During ripening, reactions occur which result in a more uniform distribution of the xanthate group on the cellulose and a gradual decomposition of the xanthate molecule which progressively reduces its ability to remain dissolved, and increases the ease of viscose-cellulose regeneration.

Viscose is essentially a solution of cellulose xanthate in an aqueous solution of sodium hydroxide. Viscose is aged (by controlling time and temperature) to promote a more uniform distribution of xanthate groups across the cellulose chains. This aging (also termed "ripening") is controlled to facilitate gelation or coagulation. Then the viscose 21 is conveyed via pumping means such as a viscose pump 22 and transfer means such as pipe 23 to optional mixing means such as a static mixer 24. An olefinic oxide polymer 25 such as poly(ethylene oxide) may optionally be added as a metered solution to the static mixer 24 which contains a series of baffles to facilitate mixing of the olefinic oxide polymer 25 and viscose 21. The viscose 21 and optional poly(ethylene oxide) 25 are preferably uniformly mixed to produce a homogeneous solution which is transferred by transfer means 26 such as a pipe to an extrusion die or nozzle 27 which immediately opens into coagulation and regeneration means such as a tank hereinafter referred to as an aquarium 28 containing an acid such as sulfuric acid which initiates and causes coagulation and regeneration thereby forming a shaped article. The aquarium may also contain agents to modify the rate of regeneration, such as metal salts, such as those as is well known in the art of making sausage casings.

A nonwoven substrate 29 of a noncellulose (and optionally cellulose) fiber web is admitted to die 27 where the viscose is extruded onto the substrate 29 before it enters the aquarium. Different dies are used for production of tubular and sheet articles and suitable dies are well known in the extrusion art. In the production of tubular, cellulose coated, nonwoven battery separators, the nonwoven substrate is shaped into a tube prior to coating with viscose. The tubular form is obtained by forcing the viscose through a restricted opening, for example, an annular gap. The diameter and gap width of the opening, as well as the rate at which the viscose is pumped through, are designed in a manner well known to those skilled in the art for coating fiber-reinforced cellulosic nonwovens such that a planar or tubular cellulose coated nonwoven of specific wall thickness and diameter is formed from the viscose. Such process is easily adapted to coat noncellulosic nonwoven webs in accordance with the present invention without undue experimentation.

In one embodiment of the present invention, the cellulosic coating solution e.g. viscose is allowed to only slightly penetrate the nonwoven substrate prior to admittance to the aquarium and penetration time may be adjusted e.g. by modifying the distance between the die and aquarium and/or adjusting the travel speed of the article, and/or by selection of the degree of polymerization of the cellulosic coating. Use of viscose with subsequent regeneration is illustrative of one embodiment of the invention, but other cellulose solutions and solubilized derivatives may also be used as noted above. Fundamental to the present invention is the concept of using a process in which cellulose or a cellulose derivative is put in contact with a nonwoven substrate comprising noncircular fibers having a noncircular cross-sectional perimeter which has a percentage cross-sectional area difference relative to a circumscribed circle according to the formula:

$$\frac{B-A}{B} \times 100 \geq 10$$

wherein A=Area of a noncellulosic fiber cross-section; and B=Area of a circle circumscribing said fiber cross-section. Preferably the percentage cross-sectional area difference may be at least 25% or greater, more preferably at least 50% or greater. Preferably, the absorptive rate of separators made by the above process may be at least 15, more preferably at least 20, still more preferably at least 25, most preferably at least 30 millimeters(mm) per 10 minutes in an aqueous solution of 40 weight % KOH. The area A is that enclosed by the fiber cross-section perimeter regardless of whether the fiber is hollow or not. Typically such fibers are solid, but hollow fibers are also contemplated by the present invention. Where required, the separators may be treated with a surfactant and/or annealed to improve separator properties including stabilization against curling. Preferred separators using noncellulosic nonwovens, such as polyamide nonwovens, are degradation resistance in electrolyte over time. Battery separators also preferably have a retained wet tensile strength after 41 days, preferably 83 days, of at least 70%, preferably at least 90%. In some preferred embodiments of the invention, by increasing the speed in which the coated nonwoven is regenerated after contact between non-woven and coating material, the amount of cellulose or cellulose derivative penetration into the nonwoven may be limited or controlled to improve the absorption rate or the electrolyte absorptive capacity. Penetration may also be controlled or limited by increasing the viscosity of the coating liquid, e.g. by lowering the temperature of the coating film or by using pressure differentials across the substrate thickness. Another way of limiting or controlling penetration is to modify the degree of polymerization of the coating material. A combination of one or more of the above parameters may also be adjusted to modify penetration.

It will be appreciated that various forms of dies known in the art may be used. In tubular film manufacture the die has an annular opening. For production of flat film or sheets the die may be a slot. Coextrusion dies may be employed as well as dies for coating opposing sides of the nonwoven substrate.

Optionally, the olefinic oxide polymer may be added to the cellulose, cellulosic solution or cellulose derivative at any point prior to the extrusion or shape forming step as long as the poly(ethylene oxide) becomes sufficiently mixed to produce a homogeneous mixture at extrusion. It should be clearly understood that such addition of olefinic oxide polymer may be made at various points prior to extrusion regardless of the process utilized to create an extrudable cellulose or extrudable cellulose derivative including the aforementioned cuprammonium, cellulose acetate, N-methyl-morpholine-n-oxide, zinc chloride, and cellulose carbamate processes as well as the well known viscose process which is presented here as a preferred example of the applicable processes.

Extrusion of viscose onto the nonwoven substrate 29 (having noncellulosic fibers preferably in amounts of at least 50 weight % of the nonwoven) through die 27 into the aquarium 28 produces a partially coagulated and regenerated cellulosic coated-nonwoven composite article by action of a mixture of acid and salt, for example, sulphuric acid, sodium sulphate and ammonium sulphate. A typical bath contains about 2–10% sulfuric acid by weight, and the bath temperature may be about 30–56° C.

The cellulose coated, noncellulosic nonwoven emerging from the acid/salt bath is conveyed by transfer means 30 to additional acid regeneration means 31 such as one or more consecutive tubs of dilute acid. The purpose of these baths is to ensure completion of the regeneration. During regeneration, gases (such as $H_2S$ and $CS_2$) are released through both the inner and outer surfaces of the coated nonwoven, and means must be provided for removing these gases from the article. The regenerated cellulosic-nonwoven composite article, by way of example, may be a tube which is then conveyed by transfer means 32 to washing means 33 such as one or more consecutive tubs of heated water which may also contain additives such as a dilute (<10%) aqueous solution of chlorine bleach or caustic e.g. to adjust pH and facilitate removal of sulphur by-products or other additives to adjust or modify separator properties including hydrophilicity, dielectric constant, etc.

The above process is similar to that for making fibrous sausage casing which has also been used commercially in the past for battery separators. Although glycerin is used in sausage casing to facilitate plasticization, it is omitted from production of battery separators. The present invention may also vary the degree of polymerization (DP) and/or process conditions to limit penetration of the cellulosic film into the nonwoven to improve absorption rates and electrolyte absorption capacity. Degree of polymerization (DP) as used herein means the number of anhydroglucose units in the cellulose chain. DP may be determined by methods known in the art such as ASTM D-1795–90. DP values of at least 350, preferably between 350–800, may be utilized in the present invention. Battery separators are beneficially free of glycerin which interferes with battery performance.

In production of tubular battery separators during the cellulose regeneration step, as described above, sulfur-containing gases and water vapor accumulate inside the regenerating tube. These waste gases must be removed, and this is may be done by slitting the battery separator walls at intervals during production so the waste gases may be vented.

The viscose is extruded onto preferably only one, or optionally both sides of a tube which is usually formed by folding a web of a nonwoven substrate sheet so that the opposing side edges overlap. In production of battery separators, the viscose impregnates a nonwoven tube where it is coagulated and regenerated to produce a tubular separator. In the present invention this coating is onto a noncellulosic substrate or optionally the nonwoven substrate may comprise both noncellulosic fibers and cellulosic fibers. In one embodiment of the invention penetration is limited to enhance the absorption rate and/or total electrolyte (e.g. KOH) absorption. The nonwoven substrate provides fiber reinforcement which is generally utilized to provide degradation resistance, high tensile strength, a fast absorption rate and/or high electrolyte absorption.

The washed article of regenerated cellulose is conveyed by transfer means 34 to drying means 35. Drying means 35 may be humidity controlled hot air dryers where the moisture content of the article is adjusted to provide a battery separator. These hot air dryers may inflate the separator article e.g. between transfer means 34 and 36 (which may be paired nip rollers). This inflation may be controlled to impart a transverse direction force, stretch, or orientation. Preferably, a transverse orientation is applied to at least maintain the diameter of the originally formed tube against shrinkage.

Separators of the present invention may be humidified to a level sufficient to allow the separators to be handled without undue cracking or breakage from brittleness. A non-glycerin humectant or plasticizer such as poly(ethylene oxide) which does not unduly interfere with battery function may be employed to regulate moisture and/or electrolyte retention and separator swelling to produce a battery separator which has sufficient flexibility, or only water may be used with water barrier packaging to ensure proper moisture levels prior to usage.

Battery separators suitable for use in the present invention may have a moisture content of less than about 100 wt. % based upon the bone dry gauge (BDG) weight of the separator.

The separator of the present invention prior to use in a battery has a moisture content ranging from about 4 wt. % BDG to about 25 wt. % BDG, preferably 4–12 wt. % BDG, with 8–12 wt. % BDG especially preferred. Higher moisture levels may inhibit or limit total KOH (or electrolyte) absorption and may also lower absorption rates.

Referring again to FIG. 1 of the drawings, the dried, moisture adjusted separator is conveyed via transfer means 36 to collection means 37 such as a take-up reel or slitting operation to produce rolls of flat sheet. Typical transfer means 30, 32, 34, and 36 may each comprise one or more rollers. These rollers may be selected and operated at different speeds to impart a machine direction force, stretch or orientation. Typically the end of the roll of the separator on the reel 37 is taped to the roll to prevent unwinding and the reeled roll of separator is placed in a plastic bag(not depicted) which acts as a water barrier. The bag is closed around the roll and the open end folded or otherwise closed to prevent moisture loss. The enclosed reel is then held in a "hot room" for at least 8, preferably at least 48, hours at an elevated temperature of at least 40° C., preferably at least 45° C. The moisture level is controlled by enclosure within the closed plastic bag which acts as a moisture barrier so that the total moisture level which was previously adjusted to 4 to 25 (preferably 4 to 12) weight percent based upon the bone dry gauge of the separator does not change. This holding step, which is referred to and defined here as an annealing step, stabilizes the separator's layflat properties against curling so that subsequent to the annealing step, a portion of the separator may be unreeled, captured by a vacuum plate, severed from the reel, and remain held under force of vacuum to permit subsequent handling, e.g. insertion into a battery can. It is believed without wishing to be bound by the belief that the holding period permits a more thorough equilibration of moisture between the cellulosic coating and the nonwoven substrate and also causes internal stresses and strains from previous process steps to be relieved or removed to an extent which reduces the tendency toward curling in either or both machine and transverse directions. During the holding step the separator may be held under a machine direction tension, preferably of from about 1 to 4 pounds per linear inch (width) for a double layer (thickness) of separator. Thus, the flatwidth of the collapsed tube is the specified width with both sides of the tube being the "double layer". The result of the holding step under the specified conditions is a battery separator which may successfully be used to assemble batteries in high speed manufacturing operations with a minimum loss of productivity due to improper or failed insertion of the separator into the battery container. Longer holding periods and/or higher temperatures may improve reduction of curl. For example, holding periods of 16, 24, 48, 120, or 168 hours or longer at elevated temperatures and constant total moisture content may be used. The ideal temperature and holding period may be determined without undue experimentation and may be dependent upon many chosen variables such as the materials chosen for the substrate, the nature of the cellulosic coating, degree of polymerization, degree of dryer stretching, etc. A 7 day holding period has been found suitable to provide excellent layflat and stabilization against curl.

Figure 2:
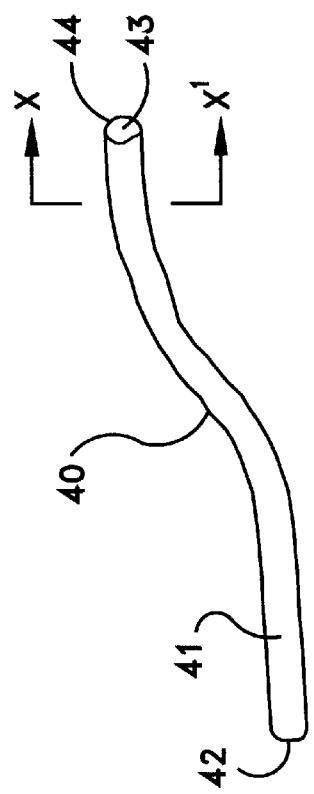
FIG. 2 is a perspective view of a generally round fiber.

Referring now to FIG. 2 of the drawings, a perspective view of an elongate fiber 40 is shown having a generally round cross-section. Round fiber 40 has an outer surface 41 with a first end 42 and an opposing end 43 and a cross-section which has a generally circular or round perimeter 44.

Figure 3:
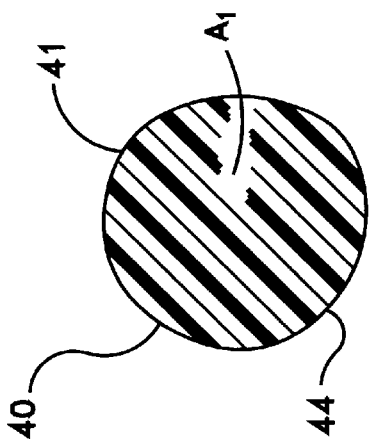
FIG. 3 is a cross-sectional view of the fiber of FIG. 2 taken along line X–X'.

Referring now to FIG. 3 of the drawings, a cross-section of fiber 40 taken about plane X–X' of FIG. 1 is depicted. This fiber 40 is similar in shape to the fiber disclosed in the examples below comprising CEREX™ 2315 nonwoven substrate. Fiber 40 has an outer surface 41 with a generally round, almost circular, perimeter or circumference 44. An area "$A_1$" of the fiber cross-section is defined by the cross-sectional perimeter 44.

Figure 4:
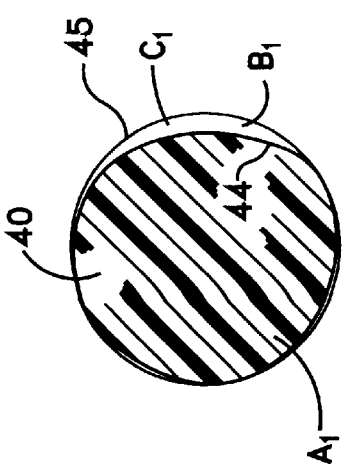
FIG. 4 is the view of FIG. 3 with a circle circumscribed about the perimeter of the fiber cross-section.

Referring now to FIG. 4 of the drawings, the cross-sectional view of FIG. 3 is repeated with the perimeter 44 of fiber 40 being circumscribed by a circle 45. The area "$A_1$" defined by perimeter 44 is less than an area "$B_1$" defined by the circumscribed circle 45. This fiber has a cross-sectional perimeter 44 which has a percentage cross-sectional area difference relative to the circumscribed circle 45 according to the formula:

$$\frac{B_1 - A_1}{B_1} \times 100 < 10$$

wherein $A_1$=Area of a noncellulosic fiber cross-section; and $B_1$=Area of a circle circumscribing said fiber cross-section. The area difference "$C_1$" between the area "$B_1$" of the circle 45 and the area "$A_1$" of the fiber cross-section is less than 10% of the area "$B_1$" of the circle 45.

Figure 5:
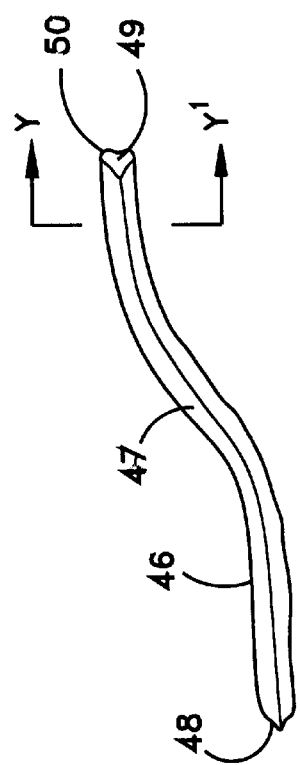
FIG. 5 is a perspective view of a noncircular fiber useful in the present invention.

Referring now to FIG. 5 of the drawings, a perspective view of an elongate fiber 46 is shown having a noncircular cross-section. Noncircular fiber 46 has an outer surface 47 with a first end 48 and an opposing end 49 and a cross-section which has a generally triangular perimeter 50.

Referring now to FIG. 6 of the drawings, a cross-section of fiber 46 taken about plane Y-Y' of FIG. 5 is depicted. Fiber 46 has an outer surface 47 with a noncircular, generally triangular, perimeter or circumference 50. An area "$A_2$" of the fiber cross-section is defined by the cross-sectional perimeter 50. Fiber 46 has three lobes 51, 52, and 53.

Referring now to FIG. 7 of the drawings, the cross-sectional view of FIG. 6 is repeated with the perimeter 50 of fiber 46 being circumscribed by a circle 54. The area "$A_2$" defined by perimeter 50 is less than an area "$B_2$" defined by the circumscribed circle 54. This fiber has a cross-sectional perimeter 50 which has a percentage cross-sectional area difference relative to the circumscribed circle 54 according to the formula:

$$\frac{B_2 - A_2}{B_2} \times 100 \geq 10$$

wherein $A_2$=Area of a noncellulosic fiber cross-section; and $B_2$=Area of a circle circumscribing said fiber cross-section. The area difference "$C_2$" between the area "$B_2$" of the circle 54 and the area "$A_1$" of the fiber cross-section is greater than or equal to 10%, (preferably $\geq 25\%$) of the area "$B_2$" of the circle 54. The area difference $C_2$ is made up of the sum of three portions of the circumscribed circle 54 bounded by fiber perimeter 50 with a first portion defined by the circle and the fiber perimeter 54 between lobes 51 and 52, a second portion defined by the circle and the fiber perimeter 54 between lobes 51 and 53, and a third portion defined by the circle and the fiber perimeter 54 between lobes 52 and 53.

Referring now to FIG. 8 of the drawings, a cross-sectional view of an alternate noncircular, hollow generally rectangular fiber 55 believed useful in the present invention is depicted. Fiber 55 has a perimeter 56 and is hollow having an elongate space extending along the fiber's length from hollow portion 57. This hollow portion 57 is defined by an interior surface 58. A circle 59 is circumscribed about the perimeter 56 of the fiber 55 cross-section. The perimeter 56 defines an area $A_3$ of rectangular fiber 55 which includes the area of the hollow portion 57. For the purpose of the present invention the cross-section area of the fiber always includes any self-contained hollow portions. The area "$A_3$" defined by perimeter 56 is less than an area "$B_3$" defined by the circumscribed circle 59. This fiber 55 has a cross-sectional perimeter 56 which has a percentage cross-sectional area difference relative to the circumscribed circle 59 according to the formula:

$$\frac{B_3 - A_3}{B_3} \times 100 \geq 10$$

wherein $A_3$=Area of a noncellulosic fiber cross-section; and $B_3$=Area of a circle circumscribing said fiber cross-section. The area difference "$C_3$" between the area "$B_3$" of the circle 59 and the area "$A_3$" of the fiber cross-section is greater than or equal to 10%, (preferably $\geq 25\%$) of the area "$B_3$" of the circle 59. The area difference $C_3$ is made tip of the sum of four portions of the circumscribed circle 59 bounded by fiber perimeter 56 with a first portion defined by the circle and the fiber perimeter 56 between rectangle "corners" 60 and 61, a second portion defined by the circle and the fiber perimeter 56 between corners 61 and 62, a third portion defined by the circle and the fiber perimeter 56 between corners 62 and 63, and a fourth portion defined by the circle and the fiber perimeter 56 between corners 60 and 63. These "corners" abut the circle to form four portions whose sum equals the area difference $C_3$.

Referring now to FIG. 9 of the drawings, a cross-sectional view of an alternate fiber 64 believed useful in the present invention is depicted. This fiber 64 is noncircular being generally oval in cross-sectional shape having a perimeter 65 defining the oval cross-section and area $A_4$. A circle 66 is circumscribed about the perimeter 65 of the oval fiber 64 cross-section. The same formula applies to this fiber as above for FIG. 8, but with area $B_4$ defining the area of the circle 66, $A_4$ defining the fiber cross-section area and $C_4$ defining the area difference between the two areas. This area difference $C_4$ is greater than or equal to 10%, (preferably $\geq 25\%$) of the area "$B_4$" of the circle 66. The area $C_4$ is made up of two opposing area portions defined by the circle 66 and opposing oval end portions 67 and 68, both of which abut the circle 66.

Referring now to FIG. 10 of the drawings, a cross-sectional view of an alternate fiber 69 believed useful in the present invention is depicted. This fiber 69 is noncircular being generally Y-shaped in cross-sectional shape having a perimeter 70 defining the Y-shaped cross-section and area $A_5$. A circle 71 is circumscribed about the perimeter 70 of the Y-shaped fiber 69 cross-section. The same formula applies to this fiber as above for FIG. 9, but with area $B_5$ defining the area of the circle 71, $A_5$ defining the fiber cross-section area and $C_5$ defining the area difference between the two areas. This area difference $C_5$ is greater than or equal to 10%, (preferably $\geq 25\%$) of the area "$B_5$" of the circle 71. The area $C_5$ is the sum of three area portions defined by the circle 66 and the fiber perimeter 70 between ends 72, 73, and 74 of the Y-shaped fiber 69 all of which abut the circle 71.

The following examples including comparative examples are given to illustrate the present invention.

Experimental results of the following examples are based on tests similar to the following test methods unless noted otherwise. All percentages expressed above and below are by weight unless otherwise noted.

The following ASTM test methods may also be utilized to test properties of the inventive separator.

Tensile Properties/Tensile Strength: ASTM D-882, method A

Gauge: ASTM D-2103

Degree of Polymerization: ASTM D-1795–90

All ASTM test methods noted herein are incorporated by reference into this disclosure in their entirety.

Basis Weight of Battery Separators

Basis weight is a measure of the amount of separator material present including any equilibrium moisture in the separator at the time of measurement. Unless otherwise noted basis weight is reported in units of grams per square meter (g/m$^2$). The test procedure is as follows:

1. A template measuring 11.5 cm×17.5 cm is placed on the separator.
2. A sharp blade is used to cut around the template to make a sample measuring 11.5 cm×17.5 cm (area=201.25 cm$^2$=0.0201 m$^2$=49.75 m$^{-2}$).
3. The cut sample is weighed to an accuracy of 0.0001 grams (g).

4. The basis weight is calculated by multiplying the weight (g) in step 3 by 49.75 m$^{-2}$.

KOH Absorption Capacity of Battery Separators

Potassium hydroxide (KOH) absorption is a measure (reported in g/m$^2$) of how much electrolyte a separator will hold. This measurement is referred to as Absorption Capacity, Total Absorption, or as KOH Absorption. The test procedure is as follows:

1. A template measuring 1.25"×0.75" is placed on the separator
2. A sharp blade is used to cut around the template to make a s ample measuring 1.25"×0.75" (area=0.9375 in$^2$= 0.0006048 m$^2$=1653 m$^{-2}$).
3. The cut sample is weighed to an accuracy of 0.0001 g.
4. For this test the basis weight (in g/m$^2$) is calculated by multiplying the weight in step 3 by 1653 m$^{-2}$.
5. The cut separator sample is allowed to soak in an aqueous solution of KOH of reported strength for 10 minutes.
6. The fully soaked separator is removed from the electrolyte with tweezers and allowed to drip until excess electrolyte is gone (approximately 10–30 seconds).
7. Each flat surface of the separator is then with tweezers dragged across a glass plate until it is visually apparent that no additional excess electrolyte is being transferred to the glass plate. This removes the excess surface electrolyte from the separator.
8. The saturated separator is then weighed to the nearest 0.0001 g.
9. The electrolyte saturated weight of the separator is calculated by multiplying the weight from step 8 by 1653 m$^{-2}$.
10. The KOH absorption is calculated by subtracting the basis weight of the separator (from step 4) from the saturated weight of the separator (from step 9) and is reported in g/m$^2$.

Absorption Rate of Battery Separators

Absorption rate is a measure of how quickly electrolyte will absorb into a battery separator. The following procedure is used:

1. A template measuring 2"×4" is placed onto a separator.
2. The 2"×4" sample is cut with a razor blade and is marked with an arrowhead shaped notch on one of the long sides ¼" from the bottom.
3. The separator is placed into an electrolytic solution (KOH) up to the mark and the KOH strength noted.
4. The separator is allowed to absorb electrolyte for 10 minutes.
5. The highest wet edge is marked and the distance from the ¼" starting point is measured in mm.
6. The absorption rate is reported as mm of climb in 10 minutes.

The above description and below examples are given to illustrate the invention and methods of making the invention, but these examples should not be take as limiting the scope of the invention to the particular embodiments or parameters demonstrated since modifications of these teachings will be apparent to those skilled in the art.

EXAMPLES 1–3

In examples 1–3, a series of nonwoven substrates were evaluated. Examples 1–3 are comparative examples (Not of the Present Invention). Comparative example 1 is a nonwoven web of spunbonded polyamide fibers having a substantially circular or round cross-section similar to that depicted in FIGS. 2–4. This spunbonded nonwoven substrate is commercially available under the trademark CEREX™ 2315 from Cerex Advanced Fabrics, L.P. of Pensacola, Fla., U.S.A. Comparative example 2 is a nonwoven web of wet laid polyamide fibers having a substantially circular or round cross-section. This wet laid nonwoven is commercially available under the trademark FREUDENBERG™ FS 2215 from Freudenberg Faservliesstoffe KG of Weinheim, Germany. Comparative example 3 is a nonwoven web of spunbonded polyamide fibers having a noncircular cross-section of a triangular shape. These fibers of example 3 have a noncircular cross-sectional perimeter which has a percentage cross-sectional area difference relative to a circumscribed circle according to the formula:

$$\frac{B - A}{B} \times 100 \geq 10$$

wherein A=Area of a noncellulosic fiber cross-section; and B=Area of a circle circumscribing said fiber cross-section. According to this formula the difference between the area of the cross-section of these fibers of example 3 and the area of a circumscribed circle is at least 10% of the area of the circumscribed circle. Whereas for examples 1 and 2 the area difference according to the above formula is less than 10%.

The spunbonded nonwoven of example 3 is commercially available under the trademark CEREX™ 2115. For CEREX™ 2115 substrate fibers. For Cerex™ 2115 fibers the area difference according to the above formula is at least 25%. The oven dried basis weight, 10 minute absorption rate and the absorption capacity were measured with both absorptive tests performed using an aqueous solution of 30 wt. % KOH. The test results are reported in Table 1 below.

TABLE 1

| EXAMPLE NO. | Type | Oven Basis Weight (g/m$^2$) | 10 minute Absorption Rate 30 wt. % KOH (mm of climb) | 30 Wt. % KOH Absorption Capacity (g/m$^2$) |
| --- | --- | --- | --- | --- |
| 1* | Polyamide Round Fiber Spunbonded Nonwoven | 50.46 | 5.2 | 79.7 |
| 2** | Polyamide Round Fiber Wet Laid Nonwoven | 48.50 σ = 1.5 | 10.2 σ = 0.46 | 95.16 σ = 2.11 |
| 3*** | Polyamide Noncircular Fiber Spunbonded Nonwoven | 47.28–49.6 | 10–11.5 | 75.26–78.66 |

*The test data for example 1 are results of single measurements.
**For example 2, fifteen measurements were made and the mean average and standard deviation are reported.
***For example 3, two measurements were made and both are reported.
σ = standard deviation.

The absorptive rates and absorption capacities of all three substrates are relatively low compared to commercially utilized cellulose coated round fiber polyamide nonwoven substrate battery separators or separators of regenerated cellulose film laminated with adhesive to a cellulose fiber nonwoven substrate, both which typically have absorptive rates of at least 15 mm of climb in 10 minutes and absorptive capacities of at least 200 g/m² for use in high speed manufacture of can-type batteries.

EXAMPLES 4–7

In examples 4–7, a series of battery separators were evaluated. Examples 4 and 5 are comparative examples (Not of the Present Invention). Examples 6 and 7 are examples of the present invention. Comparative example 4 is a control example using from a commercial production run a prior art fiber-reinforced cellulose-coated separator available from Viskase Corporation under the trademark SEPRA-CEL. The substrate of Example 4 is a commercial abaca fiber cellulose nonwoven casing paper having a nominal dry gauge thickness of about 3 mil and a basis weight of about 25 g/m² available from C.H. Dexter Corp. Examples 4–7 were made using the viscose process (similar to that for manufacturing fiber reinforced sausage casings) to coat the nonwoven substrates and as described above. Examples 5–7 were all made during an experimental run using similar equipment and process conditions. Comparative example 5 is a nonwoven web of spunbonded polyamide fibers having a substantially circular or round cross-section as described above in Example 1. Examples 6 and 7 are both examples of the present invention. Example 6 is a cellulose coated battery separator made using a sample of the spunbonded polyamide nonwoven of example 3 having polyamide fibers with a noncircular cross-section according to the formula:

$$\frac{B-A}{B} \times 100 \geq 10$$

wherein A=Area of a noncellulosic fiber cross-section; and B=Area of a circle circumscribing said fiber cross-section. According to this formula the difference between the area of the cross-section of these fibers and the area of a circumscribed circle is at least 10% of the area of the cross-section of the circumscribed circle. Example 7 is a cellulose coated battery separator as described for Example 6 that has been annealed by holding it at constant humidity under elevated temperatures of about 42° C. for 7 days.

As described above, battery separators of cellulose film extrusion coated onto various nonwoven substrates were made and tested. The penetration of the cellulosic film into the nonwoven substrates was controlled to produce separators having high absorption rates and capacities. The degree of polymerization of the viscose used to coat the various samples was about 500. All of the coated samples were regenerated in the usual manner of the viscose process (described above) except that the samples were not plasticized with glycerin. A typical requirement for battery separators is the absence of glycerin which could interfere with battery function. The test samples of Examples 4–7 were evaluated for basis weight, absorption rate and total KOH absorption using 40 wt. % aqueous KOH solutions. The test conditions and results are described as follows in Table 2. Reported measurements are single data points except where indicated.

TABLE 2

| EXAMPLE NO. | Type | Basis Weight As Is (g/m²) | Basis Weight Oven (g/m²) | 10 minute Absorption Rate 40 wt. % KOH (mm of climb) | 40 Wt. % KOH Absorption Capacity (g/m²) |
|---|---|---|---|---|---|
| 4 | Regenerated Cellulose (R.C.) Coated Cellulose-Fiber Nonwoven | 83.16–83.63* | 76.42–76.63* | 6–10* | 243.88** σ = 8.56 |
| 5 | R.C. Coated Polyamide Round Fiber Nonwoven | 99.16 | 97.23 | 24.5** σ = 3.2 | 274.45–280.16* |
| 6 | R.C. Coated Polyamide Noncircular Fiber Nonwoven | 100.33–106.70* | 93.71–97.62* | 29.3** σ = 0.94 | 309.41–312.25* |
| 7 | R.C. Coated Polyamide Noncircular Fiber Nonwoven (Annealed for 7 days) | 97.04 | 92.35 | 27.6–29.7* | 284.7 |

*Two measurements were made and both are reported.
**Five measurements were made and the mean average and standard deviation are reported.
***Four measurements were made and the mean average and standard deviation are reported.
σ = standard deviation.

Referring now to Table 2, the absorptive rates and absorption capacities of all four substrates are suitable for use in manufacture of batteries. The inventive separators of Examples 6 and 7 all have comparable or better absorption capacities to cellulose extrusion coated cellulose fiber paper of example 4 or the round fiber polyamide nonwoven substrate battery separator of Example 5. The absorption rate of the inventive separator of Example 6 is about 3 to 40% greater than the rates measured for the round fiber polyamide separator of Example 5 whose polyamide fibers are believed to have the same composition and to differ only in shape of the fiber. The separator of Example 7 was the same as for Example 6, but was annealed in a hot room under elevated (42° C.) temperature for 7 days to improve the appearance and layflat condition of the separator. This annealing step produced a separator having an improved layflat condition while keeping the improved absorptive rate relative to the round fiber separator of Example 5. The inventive separators are shown to have faster absorptive rates which may be utilized to improve productivity and speed of assembly in high speed manufacture of can-type batteries.

EXAMPLES 8–9

In Comparative Example 8(Not of the Present invention), a battery separator was made similar to the separator of Comparative Example 5 and during the manufacturing process just prior to the drying step the tubular separator was internally coated with a surfactant on the side of the separator opposite to the side that was extrusion coated with the cellulosic coating. The surfactant was an aqueous solution of 2 wt. % Surfynol™ 440 surfactant. Example 9 is of the present invention and similar to Example 6, but was coated with a surfactant as for Example 8. The surfactant was added to improve layflat and reduce wrinkles and curling of the separator. The effect of adding surfactant upon the absorptive rate and absorption capacity was evaluated and results are reported in Table 3 below.

EXAMPLES 10–12

Examples 10 and 11 are comparative examples (Not of the Invention) which utilize an uncoated CEREX™ 2115 non-circular fiber polyamide nonwoven substrate. For comparison, the 10 minute absorptive rates and absorption capacity values were determined using a 30 wt. % KOH aqueous solution(Example 10), and also a 40 wt. % KOH aqueous solution. Example 12 is an example of the invention in which the nonwoven substrate of Examples 10 and 11 was extrusion coated with cellulose as described above for Example 6. Various properties were measured and are reported in Table 4 below.

TABLE 3

| EXAMPLE NO. | Type | Average Gauge (mil) | Average Basis Weight Oven (g/m$^2$) | 10 minute Absorption Rate 40 wt. % KOH (mm of climb) | 40 Wt. % KOH Absorption Capacity (g/m$^2$) |
| --- | --- | --- | --- | --- | --- |
| 8 | R.C. Coated Polyamide Round Fiber Wet Laid Nonwoven w/ 2% Surfactant | 6.2* $\sigma = 0.3$ | 90.36** $\sigma = 5.75$ | 22.06*** $\sigma = 4.18$ | 285.1** $\sigma = 17.88$ |
| 9 | R.C. Coated Polyamide Noncircular Fiber Spunbond Nonwoven w/ 2% Surfactant | 8.05* $\sigma = 1.2$ | 96.83**** $\sigma = 6.03$ | 33.52***** $\sigma = 5.08$ | 293.01**** $\sigma = 26.63$ |

$\sigma$ = standard deviation
*Average of 120 measurements.
**Average of 46 measurements.
***Average of 92 measurements.
****Average of 17 measurements.
*****Average of 34 measurements.

TABLE 4

| EXAMPLE NO. | Type | Average Gauge (mil) | Average Basis Weight As Is (g/m$^2$) | Average Basis Weight Oven (g/m$^2$) | 10 minute Absorption Rate 40 wt. % KOH* (mm of climb) | 40 Wt. % KOH Absorption Capacity (g/m$^2$) |
| --- | --- | --- | --- | --- | --- | --- |
| 10* | Polyamide Noncircular Fiber Spunbond Nonwoven | 5.1–5.8** | 48.59–48.91** | — | 7–10** | 132.8*** $\sigma = 7.15$ |
| 11 | Polyamide Noncircular Fiber Spunbond Nonwoven | 5.0–5.9** | 49.78–50.72** | — | 5–8** | 107.9*** $\sigma = 10.34$ |
| 12 | R.C. Coated Polyamide Noncircular Fiber Spunbond Nonwoven w/ 2% Surfactant | 7.4† $\sigma = 0.84$ | — | 104.6†† $\sigma = 3.24$ | 23.0†† $\sigma = 1.79$ | 293.0†† $\sigma = 6.62$ |

$\sigma$ = standard deviation.
*Absorption Rate and Capacity tests for Example 10 were done using 30% KOH solutions.
**Two measurements were made and both are reported.
***Five measurements were made and the average reported with the standard deviation.
†The average of 100 measurements is reported.
††The average of 67 measurements is reported.

Referring to Table 3, it is demonstrated that the absorptive rate for the inventive separator was 50% greater than for the comparative separator of Example 8, while the absorption capacity was slightly higher. Addition of a 2 wt. % aqueous solution of the SURFYNOL™ 440 surfactant improves layflat properties and is not shown to have any deleterious effect on absorptive rate or absorption capacity.

Referring to Table 4, in Examples 10 and 11, samples of the same nonwoven were tested using two different strengths of KOH solutions. Different values for absorption capacity and absorptive rates were obtained at the higher electrolyte KOH concentration(40 wt.%) compared to the nonwoven placed in a lower concentration(30 wt. %) electrolyte. In Example 12 the substrate of Examples 10 and 11 was coated with cellulose. The average gauge and oven average basis weight for Example 12 relative to Example 9 indicates increased penetration of the viscose into the substrate prior to regeneration for Example 12. This Example 12 demonstrates that increased penetration will reduce the absorption rate. This penetration can be adjusted by those skilled in the art without undue experimentation e.g. by adjusting flow velocities, rates, volumes and nozzle opening diameters to optimize the penetration and/or adhesion of the cellulosic coating to the substrate to avoid delamination while maximizing absorptive rate and absorption capacity of the separator.

The above inventive films of Examples 6, 7, 9, and 12 all exhibit suitable properties for use as battery separators.

In order to stabilize the battery separators against curl they may be held at elevated temperatures of at least 40° C. for at least 8 hours in the presence of a controlled amount of moisture to produce a separator stabilized against curling which has a moisture content of from (4 to 25 weight %) based upon the bone dry gauge of the separator.

Also, all of the inventive examples produced separators which are delamination resistant due to strong bonds between the cellulose film and nonwoven substrate. No noncellulosic glue or adhesive was necessary in this process. These separators may be used to produce inventive batteries comprising electrolyte, and an anode and a cathode separated by a battery separator, as defined herein e.g. in the above description and examples.

The above examples serve only to illustrate the invention and its advantages., and they should not be interpreted as limiting since further modifications of the disclosed invention will be apparent to those skilled in the art. All such modifications are deemed to be within the scope of the invention as defined by the following claims.

What is claimed is:

1. A battery separator comprising:
    a nonwoven substrate coated with a cellulose or cellulose derivative film on at least one side of said substrate; said substrate comprising at least 50% by wt. noncellulosic fibers having a noncircular cross-sectional perimeter which has a percentage cross-sectional area difference relative to a circumscribed circle according to the formula:

$$\frac{B-A}{B} \times 100 \geq 10$$

wherein A=Area of a noncellulosic fiber cross-section; and B=Area of a circle circumscribing said fiber cross-section.

2. A battery separator, as defined in claim 1, wherein said separator has an absorptive rate of at least 15 mm/10 minutes in an aqueous solution of 40 weight % KOH.

3. A battery separator, as defined in claim 1, wherein said separator has an absorptive rate of at least 20 mm/10 minutes in an aqueous solution of 40 weight % KOH.

4. A battery separator, as defined in claim 1, wherein said separator has an absorptive rate of at least 25 mm/10 minutes in an aqueous solution of 40weight % KOH.

5. A battery separator, as defmed in claim 1, wherein said separator has an absorptive rate of at least 30 mm/10 minutes in an aqueous solution of 40 weight % KOH.

6. A battery separator, as defined in claim 1, wherein said percentage difference is ≧25%.

7. A battery separator, as defined in claim 1, wherein said percentage difference is ≧50%.

8. A battery separator, as defined in claim 1, wherein said separator has a moisture content of from about 4 to 25 weight percent based upon the bone dry gauge of said separator.

9. A battery separator, as defined in claim 1, wherein said cellulose film is extrusion coated on said substrate.

10. A battery separator, as defined in claim 1, wherein said cellulosic film has a degree of polymerization of at least 350.

11. A battery separator, as defined in claim 10, wherein said degree of polymerization is at least 600.

12. A battery separator, as defined in claim 1, wherein said cellulose film partially penetrates into said nonwoven substrate.

13. A battery separator, as defined in claim 1, wherein said separator has a 40% KOH absorption capacity of at least 200 g/m$^2$.

14. A battery separator, as defined in claim 1, wherein said noncellulosic fibers comprise at least 75 weight % of said nonwoven substrate.

15. A battery separator, as defmed in claim 1, wherein said noncellulosic fibers comprise at least 95 weight % of said nonwoven substrate.

16. A battery separator, as defined in claim 1, wherein said nonwoven noncellulosic substrate comprises polyolefin fibers, polyamide fibers, polyester fibers, or poly(vinyl alcohol) fibers, or blends thereof.

17. A battery separator, as defined in claim 16, wherein said nonwoven substrate further comprises natural cellulose fibers, synthetic cellulose fibers, or blends thereof.

18. A battery separator, as defmed in claim 1, wherein said nonwoven substrate comprises nylon 6; nylon 66; nylon 11; nylon 12; nylon 6,12; nylon 6/12 copolymer; nylon 6/66 copolymer or blends thereof.

19. A battery separator, as defined in claim 1, wherein said nonwoven substrate comprises at least 95 weight % polyamide fibers.

20. A battery separator, as defined in claim 1, wherein said nonwoven substrate is a spun bonded substrate.

21. A battery separator, as defined in claim 1, wherein said nonwoven substrate is a wet laid substrate.

22. A battery separator, as defined in claim 1, wherein said nonwoven substrate is a dry laid substrate.

23. A battery separator, as defined in claim 1, wherein said nonwoven substrate is a melt blown substrate.

24. A battery separator, as defined in claim 20, wherein said nonwoven substrate is a polyamide.

25. A battery separator, as defined in claim 1, wherein said cellulose film comprises regenerated cellulose.

26. A battery separator, as defined in claim 1, wherein said cellulose film is derived from a cellulose material comprising at least 90% α-cellulose.

27. A battery separator, as defined in claim 5, wherein said cellulose film is extrusion coated on said substrate.

28. A battery separator, as defmed in claim 1, wherein said cellulose film on said substrate comprises at least about 60 wt. % bone dry gauge based on the weight of the nonwoven substrate.

29. A battery separator, as defined in claim 1, wherein said separator has a thickness of 20 mils(508 microns) or less.

30. A battery separator, as defined in claim 1, wherein said film is coated on one side of said substrate and a surfactant is coated on an opposing side of said substrate.

31. A battery comprising an anode and a cathode separated by a battery separator, as defined by any one of claims 1 to 30, and electrolyte.

32. A process for making a battery separator comprising:
    contacting a nonwoven substrate comprising at least 50% by weight noncellulosic fibers having a noncircular cross-sectional perimeter which has a percentage cross-sectional area difference relative to a circumscribed circle according to the formula:

$$\frac{B-A}{B} \times 100 \geq 10$$

wherein A=Area of a noncellulosic fiber cross-section; and B=Area of a circle circumscribing said fiber cross-section with a liquid cellulose or cellulose derivative solution on at least one side of the substrate; converting said solution to a solid cellulose or cellulose derivative film to form a coated substrate; washing said coated substrate in an aqueous solution; and drying the coated substrate under biaxial tension to provide a battery separator.

33. A process, as defined in claim 32, wherein said substrate is formed into a tube prior to said converting step.

34. A process, as defined in claim 32, wherein said film has a degree of polymerization of at least 350.

35. A process, as defined in claim 32, wherein said film has a degree of polymerization of at least 600.

36. A process, as defined in claim 32, wherein said battery separator has an absorptive rate of at least 15 mm./10 minutes.

37. A process, as defined in claim 32, wherein said battery separator has an absorptive rate of at least 20 mm./10 minutes.

38. A process, as defined in claim 32, wherein said battery separator has an absorptive rate of at least 25 mm./10 minutes.

39. A process, as defined in claim 32, wherein said battery separator has an absorptive rate of at least 30 mm./10 minutes.

40. A process, as defined in claim 32, wherein said area difference is $\geq 25\%$.

* * * * *